United States Patent
Hong et al.

(10) Patent No.: US 12,444,535 B2
(45) Date of Patent: Oct. 14, 2025

(54) MULTILAYER CERAMIC CAPACITOR

(71) Applicant: SAMSUNG ELECTRO-MECHANICS CO., LTD., Suwon-si (KR)

(72) Inventors: Hyuk Jin Hong, Suwon-si (KR); Young Hoon Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 114 days.

(21) Appl. No.: 18/383,565

(22) Filed: Oct. 25, 2023

(65) Prior Publication Data

US 2024/0194405 A1 Jun. 13, 2024

(30) Foreign Application Priority Data

Dec. 13, 2022 (KR) .................. 10-2022-0173680

(51) Int. Cl.
*H01G 4/012* (2006.01)
*H01G 4/12* (2006.01)
*H01G 4/232* (2006.01)
*H01G 4/30* (2006.01)

(52) U.S. Cl.
CPC ........... *H01G 4/012* (2013.01); *H01G 4/2325* (2013.01); *H01G 4/30* (2013.01); *H01G 4/1227* (2013.01)

(58) Field of Classification Search
CPC ........ H01G 4/012; H01G 4/2325; H01G 4/30; H01G 4/1227
See application file for complete search history.

(56) References Cited

U.S. PATENT DOCUMENTS

| 9,236,185 B1 * | 1/2016 | Oguni ................. H01G 4/1227 |
| 2011/0075321 A1 | 3/2011 | Yamaguchi |
| 2014/0232485 A1 | 8/2014 | Bultitude et al. |

(Continued)

FOREIGN PATENT DOCUMENTS

| JP | 2005-085823 A | 3/2005 |
| JP | 2009-283880 A | 12/2009 |
| JP | 2016-015465 A | 1/2016 |

OTHER PUBLICATIONS

European Search Report dated Jul. 17, 2024 issued in the corresponding European Patent Application No. 23208426.9.

*Primary Examiner* — Michael P McFadden
(74) *Attorney, Agent, or Firm* — Morgan, Lewis & Bockius LLP (57) ABSTRACT

A multilayer ceramic capacitor includes a body including a capacitance region in which a plurality of first internal electrodes and a plurality of second internal electrodes are alternately stacked in a first direction with a dielectric layer interposed therebetween, and first and second external electrodes disposed on the body and spaced apart from each other to be connected to the plurality of first internal electrodes and the plurality of second internal electrodes, respectively, wherein the capacitance region includes one or more groups of first openings. The first openings in each group overlap in the first direction and are continuously open in two or more internal electrodes of the plurality of first and second internal electrodes, and a number of internal electrodes included in each group is less than a total number of the plurality of first internal electrodes and the plurality of second internal electrodes.

30 Claims, 8 Drawing Sheets

(56) References Cited

U.S. PATENT DOCUMENTS

| | | | |
|---|---|---|---|
| 2014/0285946 A1* | 9/2014 | Yoon | H01G 4/0085 |
| | | | 29/25.03 |
| 2015/0364259 A1 | 12/2015 | Kanzaki et al. | |
| 2016/0093443 A1* | 3/2016 | Hirao | H01G 4/232 |
| | | | 427/79 |
| 2019/0214195 A1 | 7/2019 | Gustafson | |
| 2021/0210257 A1 | 7/2021 | Hofstätter et al. | |
| 2022/0020532 A1 | 1/2022 | Ellmore et al. | |

* cited by examiner

MULTILAYER CERAMIC CAPACITOR

CROSS-REFERENCE TO RELATED APPLICATION(S)

This application claims benefit of priority to Korean Patent Application No. 10-2022-0173680 filed on Dec. 13, 2022 in the Korean Intellectual Property Office, the disclosure of which is incorporated herein by reference in its entirety.

BACKGROUND

1. Field

The present disclosure relates to a multilayer ceramic capacitor.

2. Description of Related Art

Multilayer ceramic capacitors have been widely used as components of electronic devices, such as computers, personal digital assistants (PDAs), and mobile phones, due to their small size, high capacitance, and easy mounting, and have also been widely used as components of electrical devices (including vehicles) due to their high reliability and high strength.

Since ferroelectric (e.g., barium titanate) that may be used in a multilayer ceramic capacitor may also have piezoelectricity, the multilayer ceramic capacitor may be affected by internal stress due to a reverse piezoelectric (or electrostriction) phenomenon according to the application of a voltage, and the internal stress may cause cracks in the multilayer ceramic capacitor or deteriorate withstand voltage characteristics.

SUMMARY

Exemplary embodiments provide a multilayer ceramic capacitor which may be more robust against a reverse piezoelectric (or electrostriction) phenomenon caused by voltage application and may efficiently secure reliability.

According to an aspect of the present disclosure, a multilayer ceramic capacitor includes: a body including a capacitance region in which a plurality of first internal electrodes and a plurality of second internal electrodes are alternately stacked and overlap with one another in a first direction with a dielectric layer interposed therebetween; and first and second external electrodes disposed on the body and spaced apart from each other to be connected to the plurality of first internal electrodes and the plurality of second internal electrodes, respectively. The capacitance region includes one or more groups of first openings, the first openings in each group overlap in the first direction and are continuously open in two or more of the plurality of first internal electrodes and the plurality of second internal electrodes, and a number of internal electrodes included in each group is less than a total number of the plurality of first internal electrodes and the plurality of second internal electrodes.

According to another aspect of the present disclosure, a multilayer ceramic capacitor includes: a body including a capacitance region in which a plurality of first internal electrodes and a plurality of second internal electrodes are alternately stacked and overlap with one another in a first direction with a dielectric layer interposed therebetween; and first and second external electrodes disposed on the body and spaced apart from each other to be connected to the plurality of first internal electrodes and the plurality of second internal electrodes, respectively. The capacitance region includes one or more groups of first openings, the first openings in each group overlap in the first direction in one or more of the plurality of first internal electrodes and the plurality of second internal electrodes and are continuously open in two or more of the plurality of first internal electrodes and the plurality of second internal electrodes, a number of internal electrodes included in each group is less than a total number of the plurality of first internal electrodes and the plurality of second internal electrodes, and a width of each of the first openings is greater than 0.1% and less than 20% of a width of each of the plurality of first internal electrodes and the plurality of second internal electrodes.

According to still another aspect of the present disclosure, a multilayer ceramic capacitor includes: a body including a capacitance region in which a plurality of first internal electrodes and a plurality of second internal electrodes are alternately stacked and overlap with one another in a first direction with a dielectric layer interposed therebetween; and first and second external electrodes disposed on the body and spaced apart from each other to be connected to the plurality of first internal electrodes and the plurality of second internal electrodes, respectively, in a second direction perpendicular to the first direction. The capacitance region includes one or more groups of dielectric portions, and in each group of dielectric portions, a dielectric portion disposed in and penetrating one of the plurality of first and second internal electrodes overlaps, in the first direction, another dielectric portion disposed in and penetrating an immediately adjacent one to the one of the plurality of first and second internal electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings.

Throughout the specification, unless explicitly described to the contrary, the word "comprise" and variations, such as "comprises" or "comprising", will be understood to imply the inclusion of stated elements but not the exclusion of any other elements.

In defining directions of a hexahedron to clearly describe the exemplary embodiments of the present disclosure, L, W, and T indicated in the drawings represent a length direction, a width direction, and a thickness direction, respectively. Here, the thickness direction may be used as having the same concept as that of a stacking direction (or a first direction) in which dielectric layers are stacked.

Figure 1A:
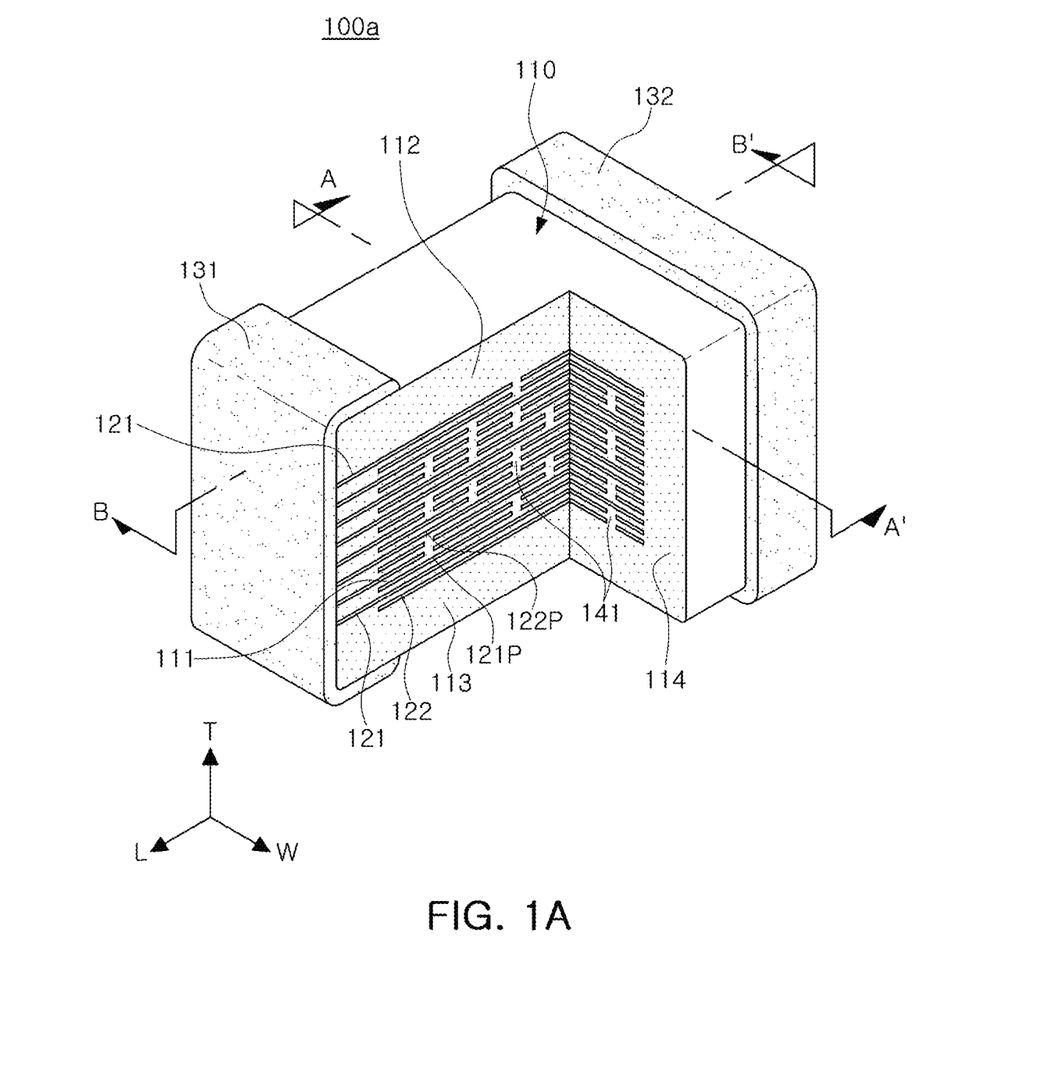
FIG. 1A is a perspective view illustrating a multilayer ceramic capacitor according to an exemplary embodiment in the present disclosure.
Figure 2:
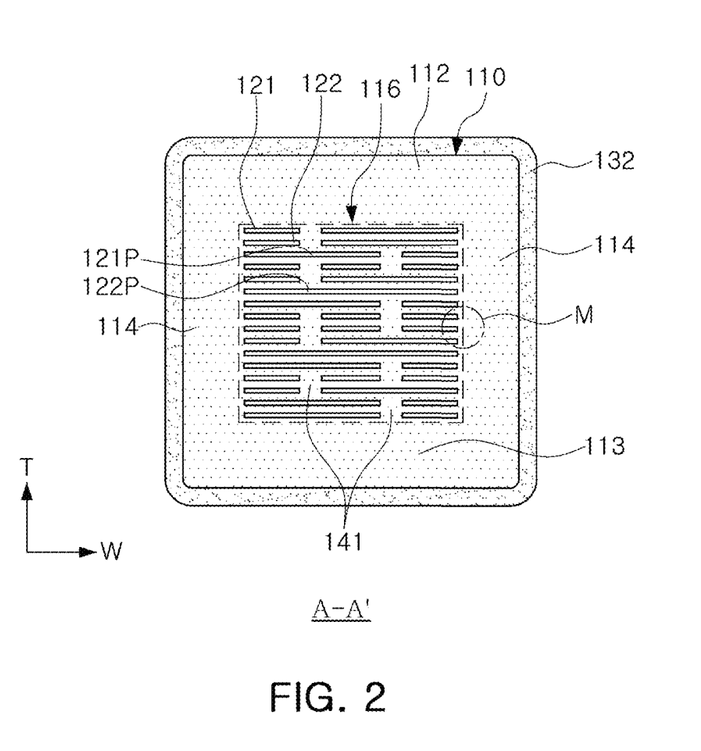
FIG. 2 is a cross-sectional view taken along line A-A' of FIG. 1.
Figure 3A:
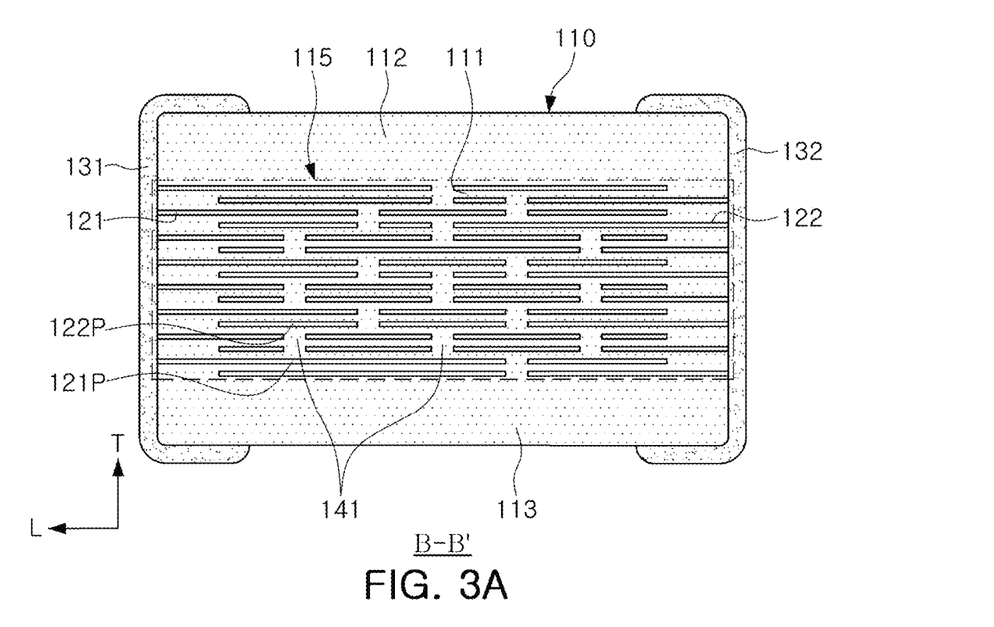
FIG. 3A is a cross-sectional view taken along line B-B' of FIG. 1.

Referring to FIGS. 1A, 2, and 3A, a multilayer ceramic capacitor 100a according to an exemplary embodiment in the present disclosure may include a body 110, a first external electrode 131, and a second external electrode 132.

The body 110 may include a capacitance region in which a plurality of first internal electrodes 121 and a plurality of second internal electrodes 122 are alternately stacked in the first direction (e.g., the T direction) with a dielectric layer 111 interposed therebetween.

For example, the body 110 may be formed of a ceramic body by firing the capacitance region. Here, the dielectric layer 111 is in a sintered state, and adjacent dielectric layers 111 may be integrated such that boundaries therebetween may not be readily apparent without using a scanning electron microscope (SEM).

For example, the body 110 may be formed of a hexahedron having both side surfaces in a length direction (L), both side surfaces in a width direction (W), and both side surfaces in a thickness direction (T), and the edges and/or corners of the hexahedron may be polished to be rounded. However, a shape and dimensions of the body 110 and the number of stacked dielectric layers 111 are not limited to those shown in the present exemplary embodiment.

The thickness of the dielectric layer 111 may be changed according to a capacitance design of the multilayer ceramic capacitor 100a, and may include ceramic powder having a high permittivity, for example, barium titanate ($BaTiO_3$)-based powder but is not limited thereto. In addition, various ceramic additives (e.g., $MgO$, $Al_2O_3$, $SiO_2$, and $ZnO$), organic solvents, plasticizers, binders, dispersants, etc. may be added to the ceramic powder according to required specifications of the multilayer ceramic capacitor 100a.

An average particle diameter of the ceramic powder used to form the dielectric layer 111 is not particularly limited and may be adjusted according to the required specifications of the multilayer ceramic capacitor 100a (e.g., miniaturization and/or high capacitance are required for capacitors for electronic devices, and high withstand voltage characteristics and/or high strength are required for capacitors for electric devices). For example, the average particle diameter of the ceramic powder may be adjusted to 400 nm or less.

For example, the dielectric layer 111 may be formed by applying a slurry including powder, such as barium titanate ($BaTiO_3$), on a carrier film and drying the slurry to form a plurality of ceramic sheets. The ceramic sheet may be formed by preparing a slurry by mixing ceramic powder, a binder, and a solvent and forming the slurry as a sheet having a thickness of several μm by a doctor blade method, but is not limited thereto.

The plurality of first internal electrodes 121 and the plurality of second internal electrodes 122 may be formed by printing a conductive paste including a conductive metal such that the first internal electrode 121 and the second internal electrode 122 are alternately exposed to one side surface and the other side surface of the body 110 in the length direction L in the stack direction (e.g., T direction), and the first internal electrode 121 and the second internal electrode 122 may be electrically insulated from each other by the dielectric layer interposed therebetween.

For example, each of the plurality of first internal electrodes 121 and the plurality of second internal electrodes 122 may be formed of a conductive paste for internal electrodes including 40 wt % to 50 wt % of conductive metal powder having an average particle size of 0.1 μm to 0.2 μm, but is not limited thereto. The conductive paste may be nickel (Ni), copper (Cu), palladium (Pd), silver (Ag), lead (Pb) or platinum (Pt) alone or alloys thereof, and the present disclosure is not limited thereto.

For example, internal electrode patterns may be formed by applying the conductive paste for internal electrodes on the ceramic sheet by a printing method or the like. A screen printing method, a gravure printing method, an inkjet printing method, and the like may be used as a printing method of the conductive paste, but the present disclosure is not limited thereto. For example, 200 to 300 ceramic sheets on which the internal electrode patterns are printed may be stacked, pressed, and fired to form the body 110.

Capacitance of the multilayer ceramic capacitor 100a may be proportional to an overlapping area of the plurality of first internal electrodes 121 and the plurality of second internal electrodes 122 in the stacking direction (e.g., T direction), may be proportional to a total stack number of the plurality of first internal electrodes 121 and the plurality of second internal electrodes 122, and may be inversely proportional to an interval between the plurality of first internal electrodes 121 and the plurality of second internal electrodes 122. The interval between the internal electrodes may be substantially equal to a thickness of each dielectric layer 111.

The multilayer ceramic capacitor 100a may have a larger capacitance compared to a thickness thereof as the interval between the plurality of first internal electrodes 121 and the plurality of second internal electrodes 122 is reduced. Meanwhile, a withstand voltage of the multilayer ceramic capacitor 100a may be higher as the interval between the internal electrodes is longer. Therefore, the interval between the internal electrodes may be adjusted according to required standards of the multilayer ceramic capacitor 100a (e.g., miniaturization and/or high capacitance are required for capacitors for electronic devices, and high withstand voltage characteristics and/or high strength are required for capacitors for electric devices). The thickness of each of the plurality of first internal electrodes 121 and the plurality of second internal electrodes 122 may also be affected by the interval between the internal electrodes.

For example, when high withstand voltage characteristics and/or strong strength are required, the multilayer ceramic capacitor 100a may be designed so that the interval between the plurality of first internal electrodes 121 and the plurality of second internal electrodes 122 exceeds twice a thickness of each of the first internal electrode 121 and the second internal electrode 122. For example, when miniaturization and/or high capacitance are required, the multilayer ceramic capacitor 100a may be designed so that the thickness of each of the plurality of first internal electrodes 121 and the plurality of second internal electrodes 122 is 0.4 µm or less and the total number of layers is 400 or more.

The first and second external electrodes 131 and 132 may be spaced apart from each other and disposed on the body 110 and connected to the plurality of first internal electrodes 121 and the plurality of second internal electrodes 122, respectively.

For example, each of the first and second external electrodes 131 and 132 may be formed by dipping into a paste including a metal component, a method of printing a conductive paste, a sheet transfer, or a pad transfer method, sputter plating, or electrolytic plating. For example, the first and second external electrodes 131 and 132 may include a fired layer formed by firing the paste and a plating layer formed on an outer surface of the fired layer, and may further include a conductive resin layer between the fired layer and the plating layer. For example, the conductive resin layer may be formed by including conductive particles in a thermosetting resin, such as epoxy. The metal component may be copper (Cu), nickel (Ni), palladium (Pd), platinum (Pt), gold (Au), silver (Ag), lead (Pb), tin (Sn) alone or alloys thereof, but is not limited thereto.

The multilayer ceramic capacitor 100a may be mounted or embedded in an external substrate (e.g., a printed circuit board), and may be connected to at least one of wiring, land, solder, and bumps of the external substrate through the first and second external electrodes 131 and 132 to be electrically connected to a circuit (e.g., an integrated circuit or a processor) electrically connected to the external substrate.

Referring to FIGS. 1A, 2, and 3A, the body 110 may include a plurality of cover layers 112 and 113 and a core region 115, and the core region 115 may include a plurality of margin regions 114 and a capacitance region 116.

The plurality of cover layers 112 and 113 may be disposed to sandwich the core region 115 therebetween in the first direction (e.g., the T direction) and may be thicker than each of the dielectric layers 111. The plurality of cover layers 112 and 113 may provide upper and lower surfaces of the body 110. A portion of each of the first and second external electrodes 131 and 132 may be disposed on a portion of an upper surface and a portion of a lower surface of the body 110.

The plurality of cover layers 112 and 113 may prevent external environmental factors (e.g., moisture, a plating solution, and foreign matter) from penetrating into the core region 115 and protect the body 110 from external impact. Bending strength of the body 110 may also be improved. For example, the plurality of cover layers 112 and 113 may include the same material as that of the dielectric layer 111 or a different material (e.g., a thermosetting resin, such as epoxy resin).

The plurality of margin regions 114 may be arranged to sandwich the capacitance regions 116 therebetween in the second direction (e.g., the W direction). For example, the plurality of margin regions 114 may be formed by attaching ceramic green sheets to side surfaces of the capacitance regions 116 according to a margin formation (MF) method. Accordingly, a boundary line M may be formed between the plurality of margin regions 114 and the capacitance region 116, but is not limited thereto.

The plurality of margin regions 114 may prevent the plurality of first internal electrodes 121 and the plurality of second internal electrodes 122 from being exposed to the surface of the body 110 in the second direction (e.g., the W direction), external environmental factors (e.g., moisture, a plating solution, foreign matter) may be prevented from penetrating into the plurality of first internal electrodes 121 and the plurality of second internal electrodes 122 through the surface in the second direction, and the reliability and lifespan of the multilayer ceramic capacitor 100a may be improved. In addition, since the plurality of first internal electrodes 121 and the plurality of second internal electrodes 122 may be formed to efficiently expand in the second direction due to the plurality of margin regions 114, the plurality of margin regions 114 may contribute to improving capacitance of the multilayer ceramic capacitor 100a by increasing an overlapping area of the plurality of internal electrodes 121 and the plurality of second internal electrodes 122.

Since the capacitance region 116 may have a structure in which a plurality of first internal electrodes 121 and a plurality of second internal electrodes 122 overlap in the first direction (e.g., the T direction), the capacitance region 116 may form capacitance. Since the dielectric layer 111 may include a ferroelectric material (e.g., barium titanate), capacitance larger than an overall size of the multilayer ceramic capacitor 100a may be formed. Since the ferroelectric material (e.g., barium titanate) that may be used in the multilayer ceramic capacitor 100a may also have piezoelectricity, the multilayer ceramic capacitor 100a may be affected by internal stress due to a reverse piezoelectric (or electrostriction) phenomenon caused by voltage application, and the internal stress may cause cracks in the multilayer ceramic capacitor 100a or degrade withstand voltage characteristics.

The capacitance region 116 of the body 110 may have one or more first openings 141 overlapping in one or more of the plurality of first internal electrodes 121 and the plurality of second internal electrodes 122 in the first direction (e.g., the T direction) to be continuously open. FIG. 1A illustrates a total of 15 first openings 141, but the number of first openings 141 is not particularly limited. Opening of the first opening 141 may be a form in which a material of the plurality of first and second internal electrodes 121 and 122 is not disposed in at least one specific space in the plurality of first and second internal electrodes 121 and 122. Continuous opening may mean that metal materials of the plurality of first and second internal electrodes 121 and 122 do not block open spaces in the plurality of first and second internal electrodes 121 and 122. Accordingly, a shape overlapping and continuous opening in the first direction (e.g., the T direction) may have a shape of a pillar extending in the first direction (e.g., the T direction). When a dielectric material is disposed in the open spaces, the pillar may be formed of a dielectric medium, and thus may be defined as a dielectric pillar.

Due to the first opening 141, a distance between portions 121P and 122P located at an upper end or a lower end of the first opening 141 in the plurality of first internal electrodes 121 and the plurality of second internal electrodes 122 may be greater than a distance between the plurality of first internal electrodes 121 and the plurality of second internal electrodes 122. Therefore, an electric field formed between the portions 121P and 122P located at the upper end or the lower end of the first opening 141 may be smaller than an electric field formed between the plurality of first internal electrodes 121 and the plurality of second internal electrodes 122. When the polarities of the portions 121P and 122P located at the upper end or the lower end of the first opening 141 are the same (e.g., when the first internal electrodes face each other or when the second internal electrodes face each other), there may be no electric field formed between the portions 121P and 122P located at the upper end or the lower end of the first opening 141. Since a reverse piezoelectric (or electrostriction) phenomenon may be caused by the formation of an electric field in a ferroelectric material, the reverse piezoelectric (or electrostriction) phenomenon near the first opening 141 in which no or small electric field is formed may be reduced. Accordingly, the overall reverse piezoelectric (or electrostriction) phenomenon of the multilayer ceramic capacitor 100a according to an exemplary embodiment in the present disclosure may be reduced, and the reliability of operation as a high voltage is applied to the multilayer ceramic capacitor 100a may be improved.

Since the inside of the first opening 141 does not include internal electrodes, when the body 110 is compressed in the first direction, a step difference may occur in the portion in which the internal electrodes are disposed around the first opening 141. Since the step difference may affect a reduction in adhesive force between the dielectric layer 111 and the adjacent internal electrodes around the first opening 141, it may act as a variable causing delamination in the vicinity of the first opening 141. As the number of internal electrodes that overlap each other in the first direction and are continuously open increases, the step difference may increase and the possibility of delamination may increase.

The number of internal electrodes (e.g., 2 to 4 in FIG. 1A) in which the first openings 141 of the multilayer ceramic capacitor 100a according to an exemplary embodiment in the present disclosure overlap in the first direction (e.g., the T direction) and are continuously open may be less than a total number (e.g., 16 in FIG. 1A) of the plurality of first internal electrodes 121 and the plurality of second internal electrodes 122. Accordingly, since a size of the step difference caused by each of the first openings 141 may be reduced, the possibility of delamination may be reduced. For example, a length of each of the first openings 141 in the first direction may be shorter than a total thickness of the capacitance region 116.

As the size (vertical length and/or horizontal width) of the first opening 141 increases, a peripheral range in which the first opening 141 reduces the reverse piezoelectric (or electrostriction) phenomenon may increase. There may be a minimum range of the peripheral range for reducing the overall reverse piezoelectric (or electrostriction) phenomenon of the multilayer ceramic capacitor 100a by reducing the reverse piezoelectric (or electrostriction) phenomenon of the first opening 141.

The number of internal electrodes (e.g., 2 to 4 in FIG. 1A) in which the first openings 141 of the multilayer ceramic capacitor 100a according to an exemplary embodiment in the present disclosure overlap in the first direction (e.g., the T direction) and are continuously open may be two or more. Accordingly, since the peripheral range in which the first openings 141 reduce the reverse piezoelectric (or electrostriction) phenomenon may not be too small, the reducing of the reverse piezoelectric (or electrostriction) phenomenon by the first openings 141 may stably lead to a reduction in the overall reverse piezoelectric (or electrostriction) phenomenon of the multilayer ceramic capacitor 100a.

FIG. 1A illustrates a structure in which 12 out of 15 first openings 141 overlap in two internal electrodes in the first direction and are continuously open and that two out of 15 first openings 141 overlap in two or more internal electrodes in the first direction and are continuously open, but is not limited thereto. For example, the number of the plurality of first internal electrodes 121 and the plurality of second internal electrodes 122 of the multilayer ceramic capacitor 100a according to an exemplary embodiment in the present disclosure may exceed 16 illustrated in FIG. 1A. Therefore, the 15 first openings 141 of FIG. 1A may be continuously open in a greater number of internal electrodes.

Referring to FIGS. 1A, 2, 3A, and 4A, a width D1 of each of the first openings 141 may be greater than a width W1 of each of a plurality of first internal electrodes 121 and 121a and a plurality of second internal electrodes 122 and 122a by 0.1% or may be less than 20% thereof. Since the width D1 exceeds the width W1 by 0.1%, the peripheral range in which the first opening 141 reduces the reverse piezoelectric (or electrostriction) phenomenon may not be too small, so that reducing of the piezoelectric (or electrostriction) phenomenon by the first opening 141 may stably lead to a reduction in the overall reverse piezoelectric (or electrostriction) phenomenon of the multilayer ceramic capacitor 100a. For example, the width D1 may be further optimized to be greater than 1% and less than 10% of the width W1. For example, the width D1 of each of the first openings 141 may be 5 μm or more, and may be a width contracted by firing the body 110 in a state of 30 μm or more. For example, when the width D1 is 5 μm, the width W1 may be greater than 25 μm and less than 5 mm.

Figure 4A:
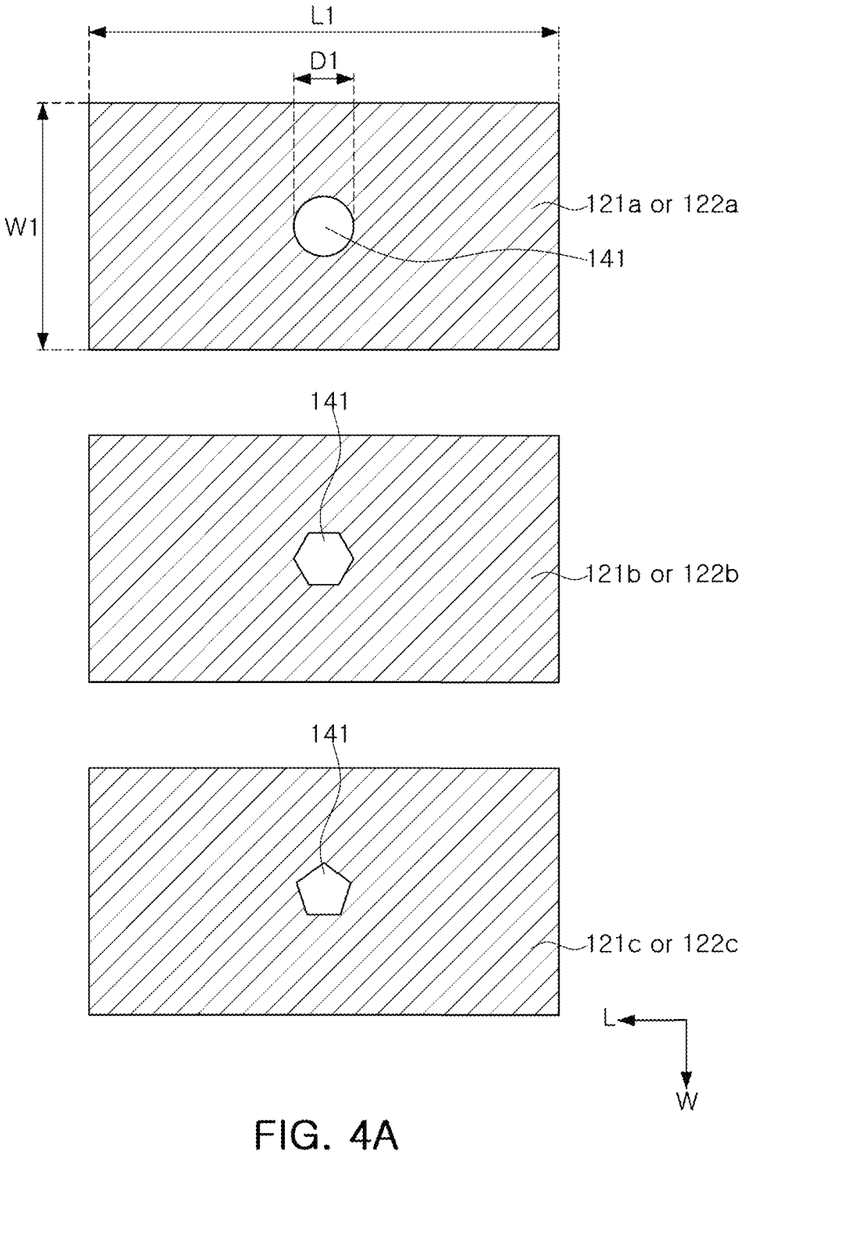
FIG. 4A is a plan view illustrating an exemplary shape of a first opening of a multilayer ceramic capacitor according to an exemplary embodiment in the present disclosure.

Since the width D1 is less than 20% of the width W1, the capacitance of the multilayer ceramic capacitor 100a may not be significantly reduced by the first opening 141. For example, the total area of the upper end or the lower end of the plurality of first openings 141 may be 10% or less of an area (a product of width W1 and length L1) of each of the plurality of first internal electrodes 121 and 121a and the plurality of second internal electrodes 122 and 122a.

When the first opening 141 has a cylindrical shape, the total area of the upper end or the lower end of the plurality of first openings 141 may correspond to a total product of (the total number of the first openings), $(D1/2)^2$, and the ratio of the circumference of a circle to its diameter. For example, the first opening 141 of each of the plurality of first internal electrodes 121b and 121c and the plurality of second internal electrodes 122b and 122c may have a polygonal shape. That is, the shape of the first opening 141 is not limited to a cylinder.

Figure 1B:
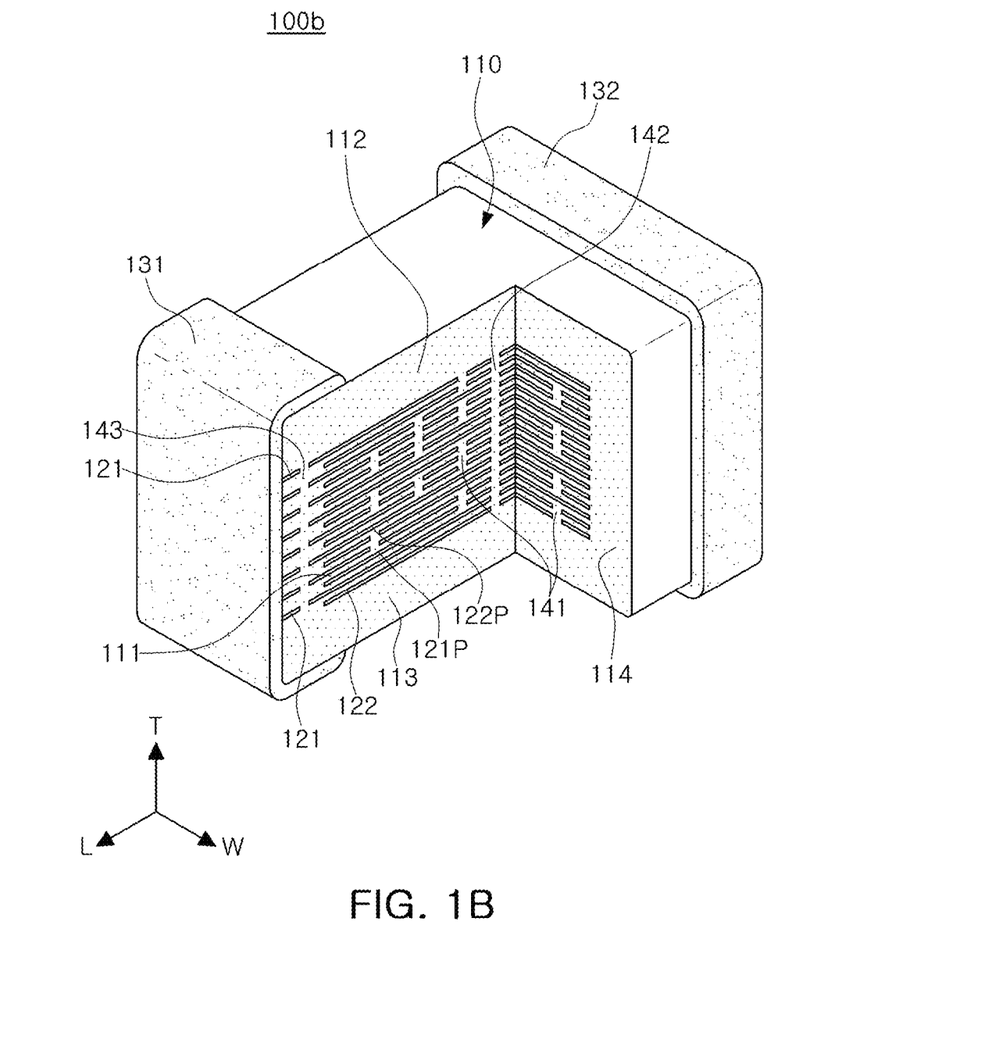
FIG. 1B is a perspective view illustrating a structure in which second and third openings are further added to a multilayer ceramic capacitor according to an exemplary embodiment in the present disclosure.
Figure 1C:
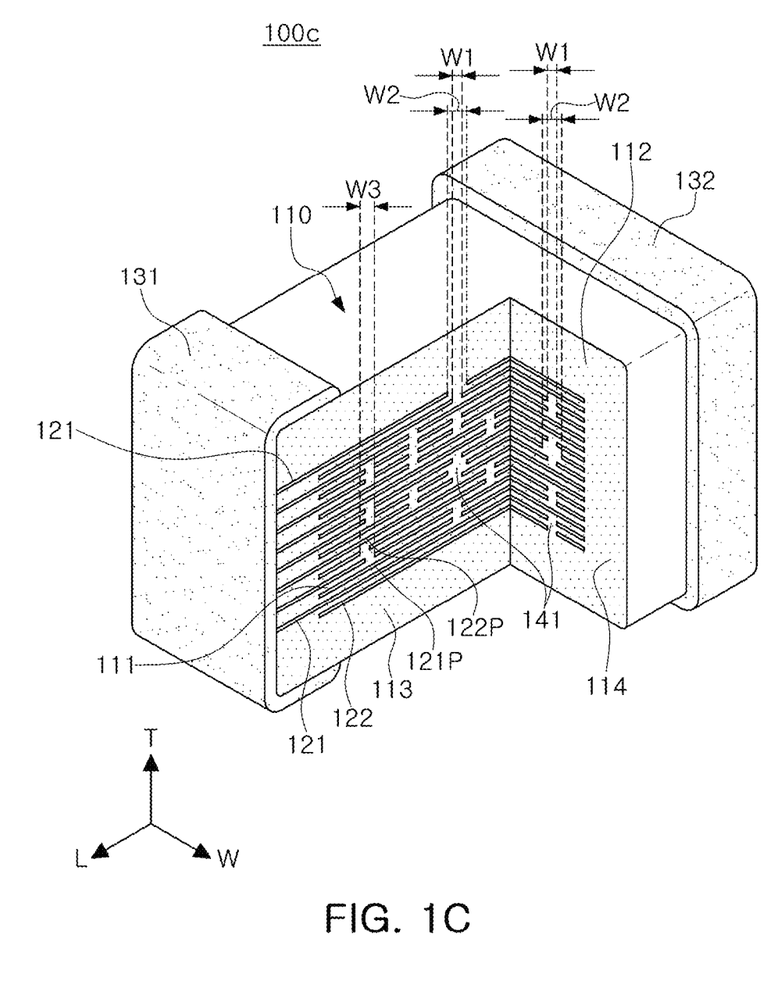
FIG. 1C is a perspective view illustrating various shapes of a plurality of first openings of a multilayer ceramic capacitor according to an exemplary embodiment in the present disclosure.

Referring to FIGS. 1A to 1C, at least two (two points indicated by 141 in FIGS. 1A to 1C) of the plurality of first openings 141 may not overlap each other in the first direction (e.g., the T direction) and may not overlap each other in a direction (e.g., a direction parallel to a plane formed by the L and W directions), perpendicular to the first direction (e.g., the T direction). Accordingly, the plurality of first openings 141 may be more distributedly disposed within the body 110, and thus, the overall reverse piezoelectric (or electrostriction) phenomenon of the body 110 may be more efficiently reduced. For example, the plurality of first openings 141 may be arranged in a mesh shape.

Some of the plurality of first openings 141 may not overlap each other in the first direction (e.g., the T direction) and may not overlap each other in the direction (e.g., the direction parallel to a plane formed by the L and W directions), perpendicular to the first direction, and the others of the plurality of first openings 141 may not overlap each other in the first direction (e.g., the T direction) and may overlap each other in the direction (e.g., the direction parallel to a plane formed by the L and W directions), perpendicular to the first direction (e.g., the T direction). Accordingly, the plurality of first openings 141 may be more distributedly disposed within the body 110, and thus, the overall reverse piezoelectric (or electrostriction) phenomenon of the body 110 may be more efficiently reduced. For example, the plurality of first openings 141 may be arranged in a matrix form.

Referring to FIG. 1B, the body 110 of the multilayer ceramic capacitor 100b according to an exemplary embodiment may further include one or more second openings 142 and/or third openings 143.

In the capacitance region of the body 110, the second openings 142 may overlap each other in the plurality of first internal electrodes 121 and the plurality of second internal electrodes 122 in the first direction (e.g., the T direction) and may be continuously open. The number (e.g., 16 in FIG. 1B) of the second openings 142 which overlap each other and are continuously open in the first direction (e.g., the T direction) may be equal to the total number (e.g., 16 in FIG. 1B) of the plurality of first internal electrodes 121 and the plurality of second internal electrodes 122. Compared to the first opening 141, performance of reducing the reverse piezoelectric (or electrostriction) phenomenon by the second opening 142 may be higher. If the number of second openings 142 is too large or too wide, the second openings 142 may increase the possibility of delamination. However, a combination structure of the plurality of first openings 141 and second openings 142 may not excessively increase the possibility of delamination of the body 110 and may obtain the performance of reducing a more improved reverse piezoelectric (or electrostriction) phenomenon.

Outside the capacitance region of the body 110, the third openings 143 may overlap each other in the first direction (e.g., the T direction) in the plurality of first internal electrodes 121 or the plurality of second internal electrodes 122 and may be continuously open. Unlike the first opening 141, the third opening 143 may be located outside the capacitance region of the body 110, so a combination structure of the first opening 141 and the third opening 143 may be distributed over a wider horizontal area and the performance of reducing the reverse piezoelectric (or electrostriction) phenomenon of the body 110 may be further improved.

Figure 4B:
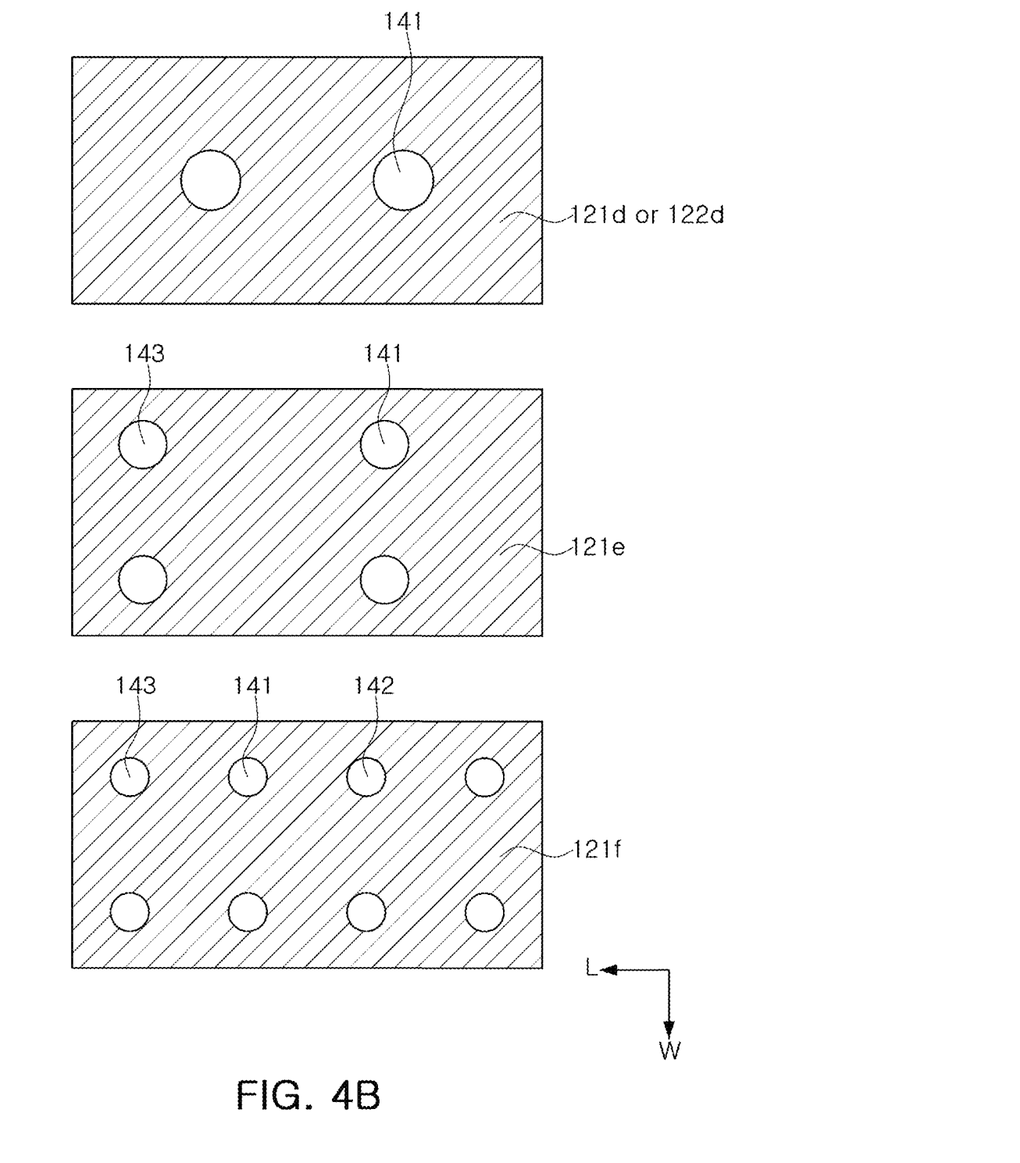
FIG. 4B is a plan view illustrating an exemplary arrangement of a plurality of first, second, and third openings of a multilayer ceramic capacitor according to an exemplary embodiment in the present disclosure.

Referring to FIG. 4B, a plurality of first internal electrodes 121d and a plurality of second internal electrodes 122d may not have the second opening 142 and the third opening 143, a plurality of first internal electrodes 121e may have only the third opening 143, among the second opening 142 and the third opening 143, and a plurality of first internal electrodes 121f may have both the second opening 142 and the third opening 143.

Referring to FIG. 1C, widths W1, W2, and W3 of one of the first openings 141 of a multilayer ceramic capacitor 100c according to an exemplary embodiment in the present disclosure may be different according to a position in the first direction (e.g., T direction) inside of one of the first openings 141. For example, a center width W2 of one of the first openings 141 may be wider than a width W1 of the upper and lower ends of one of the first openings 141.

W1, W2, and W3 may be measured as an average value of portions corresponding to W1, W2, and W3 in an L-T cross-section of the multilayer ceramic capacitor (including the center of the multilayer ceramic capacitor) formed by polishing the multilayer ceramic capacitor 100c in the W direction or in a W-T cross-section of the multilayer ceramic capacitor (including the center of the multilayer ceramic capacitor) formed by polishing the multilayer ceramic capacitor 100c in the L direction. If the L-T cross-section or the W-T cross-section does not include an opening, the W position of the L-T cross-section may be slightly changed from the center or the L position of the W-T cross-section may be slightly changed from the center. For example, the L-T section or the W-T section may be applied to analysis using at least one of a transmission electron microscopy (TEM), an atomic force microscope (AFM), a scanning electron microscope (SEM), an optical microscope, and a surface profiler, and W1 and W2 and W3 may be measured by visual confirmation or image processing of an image obtained according to the above analysis (e.g., identifying pixels based on color or brightness of the pixels, filtering pixel values for pixel identification efficiency, integration of distances between identified pixels, etc.).

For example, the width W3 of one of the first openings 141 may be greater than a width of an area in which the plurality of internal electrodes do not overlap each other in the first direction in the first opening 141. This structure may also be an exemplary embodiment of a structure in which the first openings 141 overlap in the first direction (e.g., the T direction) and are continuously open.

Figure 1D:
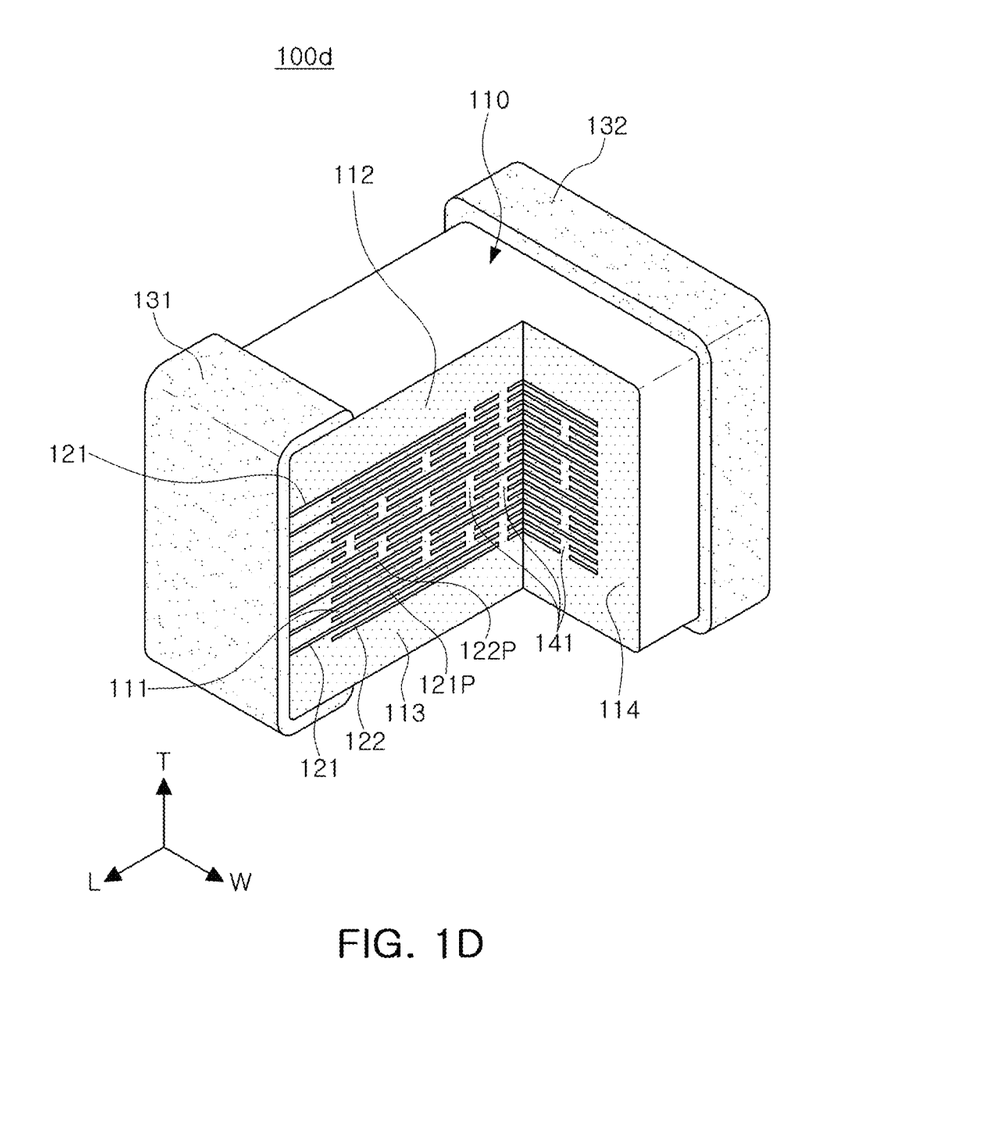
FIG. 1D is a perspective view illustrating a structure in which a plurality of first openings are more intensively disposed toward the center of a body of a multilayer ceramic capacitor according to an exemplary embodiment in the present disclosure.

Referring to FIG. 1D, a number (3 or 4 in FIG. 1D) of internal electrodes in which first openings closer to a center of the body, among the plurality of first openings 141, overlaps in the first direction (e.g., the T direction) and is continuously open is greater than a number (2 or 3 in FIG. 1D) of internal electrodes in which first openings farther from the center of the body, among the plurality of first openings 141, overlaps in the first direction (e.g., the T direction) and is continuously open. Since a point on which the reverse piezoelectric (or electrostriction) phenomenon is most concentrated in the body 110 may be the center of the body 110, the first openings closer to the center of the body 110, among the plurality of first openings 141, may be formed to be larger, thereby effectively reducing the overall reverse piezoelectric (or electrostriction) phenomenon of the body 110.

Figure 3B:
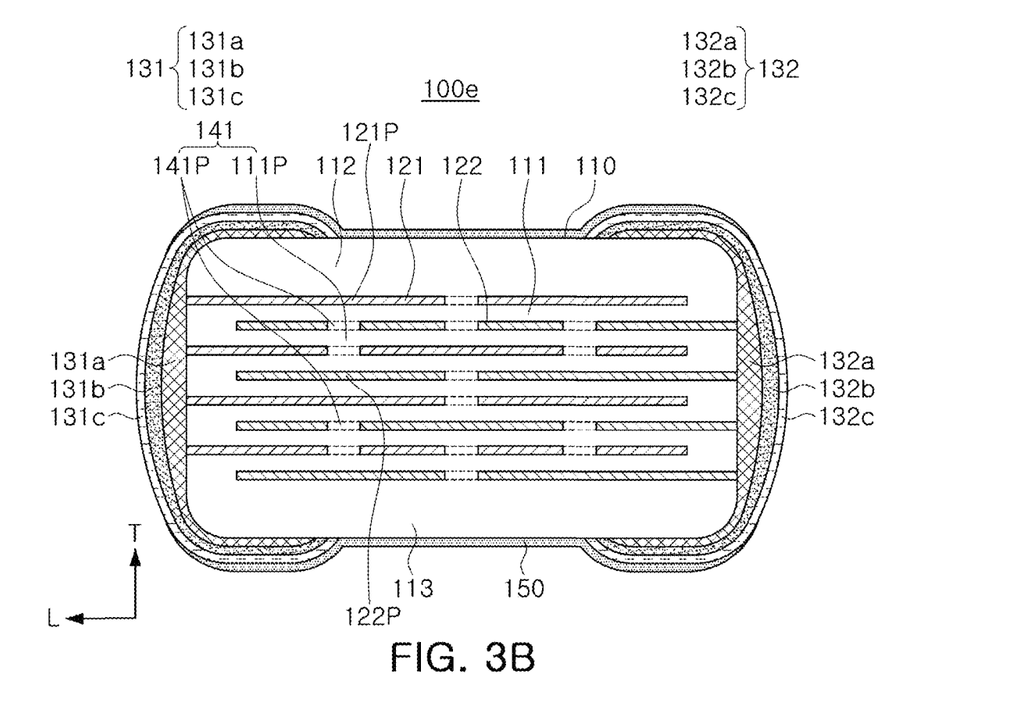
FIG. 3B is a cross-sectional view illustrating an exemplary shape of an external electrode of a multilayer ceramic capacitor according to an exemplary embodiment in the present disclosure.

Referring to FIG. 3B, a space 141P surrounded by the internal electrodes in which the first openings 141 of a multilayer ceramic capacitor 100e according to an exemplary embodiment in the present disclosure overlap in the first direction (e.g., the T direction) and are continuously open may include a ferroelectric material.

A portion of the ferroelectric material of a portion 111P overlapping each of the first openings 141 in the dielectric layer 111 in the first direction (e.g., the T direction) may move to the space 141P when the body 110 is compressed in the first direction. Thus, a combination of the space 141P and portion 111P may be a ferroelectric pillar. A ferroelectric density of the ferroelectric pillar may be lower than that of the remaining portion of the dielectric layer 111. Accordingly, the first opening 141 corresponding to the ferroelectric pillar may absorb a portion of the overall reverse piezoelectric (or electrostriction) phenomenon of the body 110.

Meanwhile referring to FIG. 3B, at least one of the first and second external electrodes 131 and 132 of the multilayer ceramic capacitors 100b, 100c, and 100d according to an exemplary embodiment in the present disclosure may include at least one of conductive resin layers 131b and 132b including a resin, base electrode layers 131a and 132a disposed between the conductive resin layers 131b and 132b and the body 110 and having conductivity higher than that of the conductive resin layers 131b and 132b, and plating layers 131c and 132c providing an outer surface of one of the first and second external electrodes 131 and 132. A portion of the surface (e.g., upper and lower surfaces) of the body 110 may be covered by a coating layer 150.

For example, the base electrode layers 131a and 132a may be formed by dipping a portion of the body 110 in a paste including a metal material and/or glass frit or firing in a state in which the paste is printed on a portion of the body 110, or may be formed by a sheet transfer or a pad transfer method. The metal material may be copper (Cu) to improve electrical connectivity with respect to the body 110 but is not limited thereto. For example, the metal material may include at least one of copper (Cu), nickel (Ni), palladium (Pd), platinum (Pt), gold (Au), silver (Ag), and lead (Pb), may vary depending on a metal material of the internal electrodes in the body 110.

For example, the plating layers 131c and 132c may be formed by sputtering or electroplating but are not limited thereto. For example, the plating layers 131c and 132c may include an inner plating layer including nickel (Ni) and an outer plating layer including tin (Sn).

For example, the conductive resin layers 131b and 132b may include a thermosetting resin, such as epoxy, and a plurality of conductive particles (e.g., the same metal material as the base electrode layer). However, it is not limited to the thermosetting resin, and the conductive resin layers 131b and 132b may include a bisphenol A resin, a glycol epoxy resin, a novolak epoxy resin, or a resin that is liquid at room temperature due to a low molecular weight thereof.

The conductive resin layers 131b and 132b may improve durability of the first and second external electrodes 131 and 132 against external impact or prevent penetration of external moisture or a plating solution into the body 110. Therefore, the conductive resin layers 131b and 132b may reduce a rate at which the reliability of the first and second external electrodes 131 and 132 deteriorates even when the first and second external electrodes 131 and 132 are exposed to harsh environments.

The coating layer 150 may cover the outer surfaces of the plurality of cover layers 112 and 113, and may further cover portions of the first and second external electrodes 131 and 132 and/or outer surfaces of the plurality of margin regions according to design. For example, the coating layer 150 may be formed of organic/inorganic compounds including Si to improve moisture resistance reliability of the body 110, and may be formed of organic/inorganic substances including fluorine (F) and polymer components. For example, the coating layer 150 may be implemented as a silane coupling agent or silicone-resin to have water repellency.

The multilayer ceramic capacitor according to an exemplary embodiment in the present disclosure may be more robust against an inverse piezoelectric (or electrostriction) phenomenon according to the application of a voltage and may efficiently secure reliability.

While example exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including a capacitance region in which a plurality of first internal electrodes and a plurality of second internal electrodes are alternately stacked and overlap with one another in a first direction with a dielectric layer interposed therebetween; and
first and second external electrodes disposed on the body and spaced apart from each other to be connected to the plurality of first internal electrodes and the plurality of second internal electrodes, respectively,
wherein the capacitance region includes one or more groups of first openings,
the first openings in each group overlap in the first direction and are continuously open in two or more internal electrodes of the plurality of first and second internal electrodes, and
a number of internal electrodes included in each group is less than a total number of the plurality of first internal electrodes and the plurality of second internal electrodes.

2. The multilayer ceramic capacitor of claim 1, wherein the one or more groups of first openings include a plurality of groups of first openings, and
at least two groups of the plurality of groups of first openings do not overlap each other in the first direction and do not overlap each other in a direction perpendicular to the first direction.

3. The multilayer ceramic capacitor of claim 2, wherein a portion of the plurality of groups of first openings does not overlap each other in the first direction and does not overlap each other in the direction perpendicular to the first direction, and
another portion of the plurality of groups of first openings does not overlap each other in the first direction but overlap each other in the direction perpendicular to the first direction.

4. The multilayer ceramic capacitor of claim 1, wherein the one or more groups of first openings include a plurality of groups of first openings, and
out of the plurality of groups of first openings, a number of internal electrodes included in a group of first openings closer to a center of the body is greater than a number of internal electrodes included in another group of first openings farther from the center of the body.

5. The multilayer ceramic capacitor of claim 1, wherein the capacitance region further includes one or more groups of second openings which overlap in the first direction and are continuously open in the plurality of first internal electrodes and the plurality of second internal electrodes, and
a number of the second openings which overlap in the first direction and are continuously open is equal to a total number of the plurality of first internal electrodes and the plurality of second internal electrodes.

6. The multilayer ceramic capacitor of claim 1, wherein the body further includes one or more groups of third openings which overlap in the first direction and are continuously open in the plurality of first internal electrodes outside the capacitance region or the plurality of second internal electrodes outside the capacitance region.

7. The multilayer ceramic capacitor of claim 1, wherein one of the one or more groups of first openings includes openings having different widths from each other depending on respective positions of the openings in the first direction.

8. The multilayer ceramic capacitor of claim 1, wherein the dielectric layer includes a ferroelectric material, and
a space surrounded, in a direction perpendicular to the first direction, by the internal electrodes included in each group of first openings includes a ferroelectric material.

9. The multilayer ceramic capacitor of claim 1, wherein the width of each of the first openings is 5 μm or more.

10. The multilayer ceramic capacitor of claim 1, wherein a width of each of the first openings is greater than 0.1% and less than 20% of the width of each of the plurality of first internal electrodes and the plurality of second internal electrodes.

11. A multilayer ceramic capacitor comprising:
a body including a capacitance region in which a plurality of first internal electrodes and a plurality of second internal electrodes are alternately stacked and overlap with one another in a first direction with a dielectric layer interposed therebetween; and
first and second external electrodes disposed on the body and spaced apart from each other to be connected to the plurality of first internal electrodes and the plurality of second internal electrodes, respectively,
wherein the capacitance region includes one or more groups of first openings,
the first openings in each group overlap in the first direction and are continuously open in two or more internal electrodes of the plurality of first and second internal electrodes,
a number of internal electrodes included in each group is less than a total number of the plurality of first internal electrodes and the plurality of second internal electrodes, and
a width of each of the first openings is greater than 0.1% and less than 20% of a width of each of the plurality of first internal electrodes and the plurality of second internal electrodes.

12. The multilayer ceramic capacitor of claim 11, wherein the one or more groups of first openings include a plurality of groups of first openings, and
at least two groups of the plurality of groups of first openings do not overlap each other in the first direction and do not overlap each other in a direction perpendicular to the first direction.

13. The multilayer ceramic capacitor of claim 12, wherein a portion of the plurality of groups of first openings does not overlap each other in the first direction and does not overlap each other in the direction perpendicular to the first direction, and
another portion of the plurality of groups of first openings does not overlap each other in the first direction but overlap each other in the direction perpendicular to the first direction.

14. The multilayer ceramic capacitor of claim 11, wherein the one or more groups of first openings includes a plurality of groups of first openings, and
out of the plurality of groups of first openings, a number of internal electrodes included in a group of first openings closer to a center of the body is greater than a number of internal electrodes included in another group of first openings farther from the center of the body.

15. The multilayer ceramic capacitor of claim 11, wherein the capacitance region further includes one or more groups of second openings which overlap in the first direction and are continuously open in the plurality of first internal electrodes and the plurality of second internal electrodes, and
a number of the second openings which overlap in the first direction and are continuously open is equal to a total number of the plurality of first internal electrodes and the plurality of second internal electrodes.

16. The multilayer ceramic capacitor of claim 11, wherein the body further includes one or more groups of third openings which overlap in the first direction and are continuously open in the plurality of first internal electrodes outside the capacitance region or the plurality of second internal electrodes outside the capacitance region.

17. The multilayer ceramic capacitor of claim 11, wherein one of the one or more groups of first openings includes openings having different widths from each other depending on respective positions of the openings in the first direction.

18. The multilayer ceramic capacitor of claim 11, wherein the dielectric layer includes a ferroelectric material, and
a space surrounded, in a direction perpendicular to the first direction, by the internal electrodes included in each group of first openings includes a ferroelectric material.

19. The multilayer ceramic capacitor of claim 11, wherein the width of each of the first openings is 5 μm or more.

20. A multilayer ceramic capacitor comprising:
a body including a capacitance region in which a plurality of first internal electrodes and a plurality of second internal electrodes are alternately stacked and overlap with one another in a first direction with a dielectric layer interposed therebetween; and
first and second external electrodes disposed on the body and spaced apart from each other to be connected to the plurality of first internal electrodes and the plurality of second internal electrodes, respectively, in a second direction perpendicular to the first direction,
wherein the capacitance region includes one or more groups of dielectric portions, and
in each group of dielectric portions, a dielectric portion disposed in and penetrating one of the plurality of first and second internal electrodes overlaps, in the first direction, another dielectric portion disposed in and penetrating an immediately adjacent one to the one of the plurality of first and second internal electrodes.

21. The multilayer ceramic capacitor of claim 20, wherein a first group among the one or more groups of dielectric portions includes dielectric portions disposed in two or more adjacent internal electrodes and overlapping with one another in the first direction, and
a number of internal electrodes included in the first group is less than a total number of the plurality of first and second internal electrodes.

22. The multilayer ceramic capacitor of claim 21, wherein a second group, different from the first group, among the one or more groups of dielectric portions includes dielectric portions disposed in two or more adjacent internal electrodes and overlapping with one another in the first direction, and
a number of internal electrodes included in the second group is equal to a total number of the plurality of first and second internal electrodes.

23. The multilayer ceramic capacitor of claim 22, wherein the body includes a third group of dielectric portions, different from the first and second groups of dielectric portions in the capacitance region, which overlap in the first direction and are continuously open in the plurality of first or second internal electrodes outside the capacitance region.

24. The multilayer ceramic capacitor of claim 20, wherein the plurality of first and second internal electrodes include neither a second group nor a third group of dielectric portions, but include only a first group of dielectric portions, where:
the first group includes dielectric portions disposed in two or more adjacent internal electrodes and overlapping with one another in the first direction, and a number of internal electrodes included in the first group is less than a total number of the plurality of first and second internal electrodes,
the second group includes dielectric portions disposed in two or more adjacent internal electrodes and overlapping with one another in the first direction, and a number of internal electrodes included in the second group is equal to a total number of the plurality of first and second internal electrodes, and
the third group includes dielectric portions which overlap in the first direction and are continuously open in the plurality of first or second internal electrodes outside the capacitance region.

25. The multilayer ceramic capacitor of claim 20, wherein the plurality of first and second internal electrodes include only a first group and a third group of dielectric portions, but do not include a second group of dielectric portions, where:
the first group includes dielectric portions disposed in two or more adjacent internal electrodes and overlapping with one another in the first direction, and a number of internal electrodes included in the first group is less than a total number of the plurality of first and second internal electrodes,
the second group includes dielectric portions disposed in two or more adjacent internal electrodes and overlapping with one another in the first direction, and a number of internal electrodes included in the second group is equal to a total number of the plurality of first and second internal electrodes, and
the third group includes dielectric portions which overlap in the first direction and are continuously open in the plurality of first or second internal electrodes outside the capacitance region.

26. The multilayer ceramic capacitor of claim 20, wherein the plurality of first and second internal electrodes include all of first, second, and third groups of dielectric portions, where:
the first group includes dielectric portions disposed in two or more adjacent internal electrodes and overlapping with one another in the first direction, and a number of internal electrodes included in the first group is less than a total number of the plurality of first and second internal electrodes,
the second group includes dielectric portions disposed in two or more adjacent internal electrodes and overlapping with one another in the first direction, and a number of internal electrodes included in the second group is equal to a total number of the plurality of first and second internal electrodes, and
the third group includes dielectric portions which overlap in the first direction and are continuously open in the plurality of first or second internal electrodes outside the capacitance region.

27. The multilayer ceramic capacitor of claim 20, wherein at least one of the plurality of first and second internal electrodes includes two or more dielectric portions disposed and separated from each other in the same internal electrode in the second direction.

28. The multilayer ceramic capacitor of claim 20, wherein at least one of the plurality of first and second internal electrodes includes two or more dielectric portions arranged and separated from each other in the same internal electrode in both of the second direction and a third direction perpendicular to the first and second directions.

29. The multilayer ceramic capacitor of claim 20, wherein the one or more groups of dielectric portions include dielectric portions having a cylindrical shape.

30. The multilayer ceramic capacitor of claim 20, wherein the one or more groups of dielectric portions include dielectric portions having a polygonal shape.

* * * * *